United States Patent [19]

Gukkenberger et al.

[11] Patent Number: 4,960,498
[45] Date of Patent: Oct. 2, 1990

[54] METHOD OF MANUFACTURING A MAGNETIC HEAD

[75] Inventors: Horst Gukkenberger, Zirndorf; Karl Eberle, Cadolzburg, both of Fed. Rep. of Germany

[73] Assignee: Grundig E.M.V. Elektromechanische Versuchsanstalt, Fürth/Bayern, Fed. Rep. of Germany

[21] Appl. No.: 88,765

[22] Filed: Aug. 24, 1987

[30] Foreign Application Priority Data

Aug. 26, 1986 [DE] Fed. Rep. of Germany ....... 3628950

[51] Int. Cl.$^5$ ............................................. C23C 14/34
[52] U.S. Cl. ........................... 204/192.2; 204/192.15; 204/192.23
[58] Field of Search ........... 204/192.15, 192.2, 192.23; 29/603; 360/120, 126, 127

[56] References Cited

U.S. PATENT DOCUMENTS

| | | | |
|---|---|---|---|
| 3,303,292 | 2/1967 | Bedell, Jr. et al. | 29/603 |
| 3,566,045 | 2/1971 | Paine | 204/192.2 X |
| 3,829,373 | 8/1974 | Kuehnle | 204/192.12 X |
| 4,049,522 | 9/1977 | Chinshie et al. | 204/192.2 |
| 4,415,427 | 11/1983 | Hidler et al. | 204/298 |
| 4,569,746 | 2/1986 | Hutchinson | 204/298 |
| 4,670,807 | 6/1987 | Gorter et al. | 360/120 |

Primary Examiner—Nam X. Nguyen

[57] ABSTRACT

A method for manufacturing a magnetic head having a sputtered soft magnetic gap region, in which the layer (5, 6) provided on the magnetic core halves (1, 2) is sputtered by means of a magnetron sputtering apparatus. By choosing the material composition of the alloy support—target—and by a suitable choice of the sputtering rates a layer having an increased magnetic property is sputtered on the magnetic core from a target having a weak magnetic property so that a larger material thickness can be chosen for the target.

3 Claims, 1 Drawing Sheet

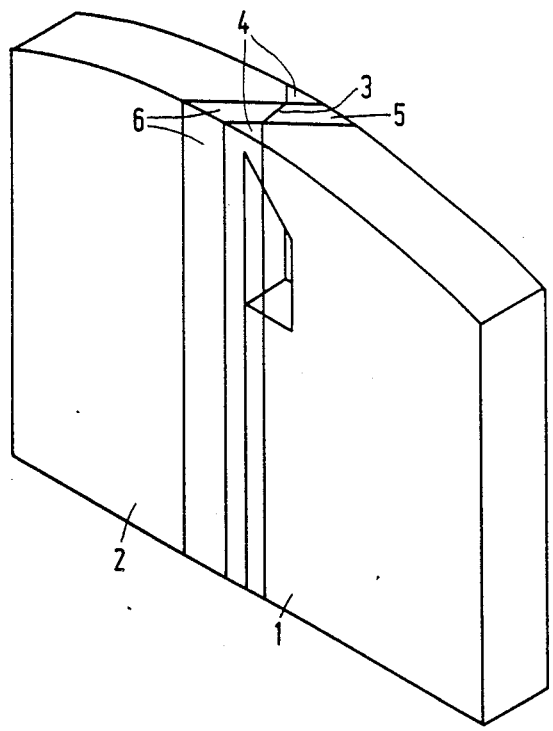

METHOD OF MANUFACTURING A MAGNETIC HEAD

BACKGROUND OF THE INVENTION

The invention relates to a method of manufacturing a video magnetic head having a sputtered gap region, in which the magnetic core consists of two soft magnetic core halves with a non-magnetic gap in between. An abrasion-resistant soft magnetic layer is sputtered by means of a maqnetron sputtering apparatus in the region between the gap and the core halves as well as between the gap and a glass inclusion.

With the advance in electronic technology magnetic materials composed of layers have gained general recognition in several technical fields and play an important role in the field of magnetic heads used for magnetic recording.

It is known that particularly video magnetic heads are composed in the form of layers of a magnetic oxide material such as polycrystalline ferrite and a magnetic material such as monocrystalline sendust. The magnetic heads may be formed with longitudinally arranged layers so that, for example a magnetic core of sendust is combined with a support of a magnetic material such as ferrite. Magnetic heads having different material layers are required in order to comply with stringent technical requirements. Recording media having a high coercive force have been developed such as metal tapes and metal tapes with vapour deposited layers in order to comply with the requirements of a high magnetic recording density. This development has been accompanied by a very intensive development of magnetic materials for magnetic heads. Since a magnetic head with a magnetic core made of simple magnetic materials has various drawbacks, a magnetic head was proposed which uses composite magnetic materials such as a magnetic metal core of sendust which is included between a magnetic oxide core of ferrite.

There are also magnetic heads with a layer construction in which the magnetic core only has a thin layer of Sendust in the gap region This layer is sputtered by means of various sputtering techniques. The use of a magnetron sputtering apparatus is advantageous because the desired layer thickness can be achieved therewith. It is, however, a drawback that the thickness of the alloy support—target—must remain relatively thin, usually thinner than 3 mm, for the alloy with a suitable magnetic property to be used and that for physical reasons only a small part of the target surface is sputtered so that target consumption is high. Thicker targets, which can more economically be processed, cannot be used for technical reasons for the alloys having a suitable magnetic property.

SUMMARY OF THE INVENTION

It is an object of the invention to provide an economic method of sputtering a given material layer having a suitable magnetic property in the gap region of the magnetic core of a magnetic head for a video magnetic tape apparatus, in which method a magnetron sputtering apparatus is to be used for sputtering.

To solve this object the soft magnetic sputtered layer is sputtered from an alloy support (target) having a weak magnetic property, for example from a target consisting of an alloy of 10% Si, 9% Al, 81% Fe and builds up by means of different sputtering rates to a layer having an increased magnetic property, for example a layer consisting of 9.6% Si, 5.4% Al, 85% Fe, or in that simultaneously a layer having increased magnetic properties is sputtered from at least two different alloy supports having a weak magnetic property by suitable choice of the sputtering rates.

BRIEF DESCRIPTION OF THE DRAWING

FIG. 1 is a perspective showing the gap region on which a sendust layer is sputtered on the magnetic core of a video magnetic head.

DETAILED DESCRIPTION OF THE PREFERRED EMBODIMENTS

The magnetic core comprises two soft magnetic core halves 1, 2 (preferably of ferrite) which are connected together via a nonmagnetic gap 3. The gap is bounded by bilaterally provided glass inclusions 4 and the two cores are thus simultaneously connected mechanically. A sputtered soft magnetic layer 5, 6 is provided on each core half 1, 2 between the gap 3 and the core halves 1, 2. The layer 5, 6 is sputtered by means of a known technique using a magnetron sputtering apparatus. The material composition of the alloy support (target) is chosen to be such that the advantages of magnetron sputtering are influenced to a slight extent only, because the alloy of which the target is composed has only weak magnetic properties. When sputtering, for example sendust, this can be achieved by increasing the aluminum and silicon contents in such a manner that the alloy has hardly any magnetic properties. During the sputtering process the sputtering rates are chosen or adjusted to be such that, dependent on the different sputtering rates, a layer is formed on the core halves which complies with the magnetic and mechanical requirements, for example a material composition of sendust.

What is claimed is:

1. A method of manufacturing a magnetic head having a sputtered gap region, in which the magnetic core comprises two soft magnetic core halves with a non-magnetic gap therebetween, a glass inclusion on either side of said gap, and an abrasion resistant soft magnetic layer between the gap and the core halves, said method comprising the following steps:

providing two alloy targets having a weak magnetic property in a magnetron sputtering apparatus, sputtering said soft magnetic layer on said core halves at sputtering rates suitable to yield a desired alloy having an increased magnetic property, one sputtering rate being used for each target.

2. A method as in claim 1 wherein at least one of said targets has an alloy composition consisting of 10% Si, 9% Al, and 81% Fe.

3. A method as in claim 1 wherein said alloy targets and said sputtering rates are chosen to yield a sputtered soft magnetic layer having a composition of 9.6% Si, 5.4% Al, and 85% Fe.

* * * * *